Patented Sept. 1, 1936

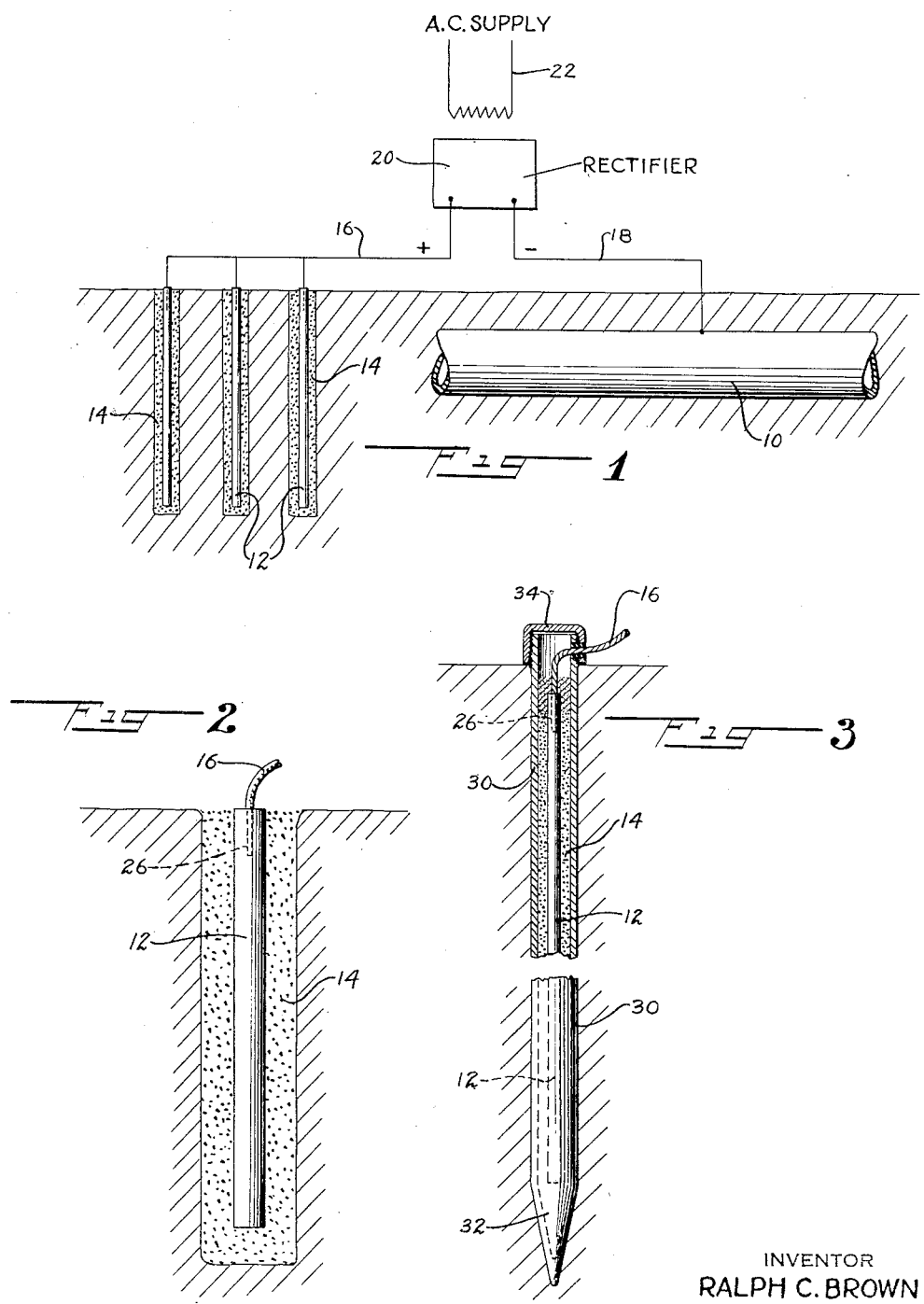

2,053,214

UNITED STATES PATENT OFFICE 2,053,214

ELECTRODE RESISTANT TO ANODIC ATTACK

Ralph C. Brown, Lakewood, Ohio, assignor, by mesne assignments, to Union Carbide and Carbon Corporation, a corporation of New York Application April 21, 1934, Serial No. 721,797

6 Claims. (Cl. 204—1)

The present invention relates to a method and means for combating metallic corrosion, and more particularly it concerns means for preserving or increasing the life of ground connections placed in an anodic position in an electric circuit, and is surrounded by an electrolyte in the form of moist earth and/or ground water.

The invention is of special utility in the grounding of electric power lines or equipment where electric currents flow to the ground continuously or intermittently, causing electrolysis at the point of contact of the ground connection with the earth. It is also highly effective for preventing or limiting corrosion of underground pipe lines by a method whereby a suitable electric current is generated and caused to flow between such a pipe line and the ground along a metallic conductor in a direction countercurrent to that causing corrosion of the metal. The pipe line thus functions as a cathode or negative electrode, and the ground connection functions as the anode or positive electrode of an electrolytic cell, of which the earth and/or ground water functions as the electrolyte.

It is well known that ferrous and non-ferrous electrically-conductive materials disintegrate by electrolysis when placed in an anodic position in an electric current in the presence of an electrolyte. Such disintegration may be due to one or more of a large number of causes, such as dissolution and oxidation of the metal, the extent thereof varying in accordance with the nature of the materials used and the conditions of their use. Metal conductors, therefore, have generally been unsatisfactory for service as grounding members for electrical devices, principally due to their short life.

Grounding connections of amorphous carbon, graphite, and the like, have largely supplanted these metal grounding members, since carbon is highly resistant to electro-chemical attack and, therefore, has a relatively long life in service. Such carbon ground connections generally are in the form of compact carbon bodies produced by extrusion processes, although other processes may be employed involving the molding or shaping of the material under pressure in the presence of a suitable binder.

The present invention is based in important part upon the discovery that the rate of disintegration of these compact amorphous carbon or graphite grounding members in the presence of an electrolyte is reduced in the general ratio of about ten to one when such members are surrounded with or packed in a more or less porous body of a conductive material highly resistant to electro-chemical attack, and preferably a crushed or granular carbon, either graphitic or non-graphitic, such as metallurgical coke, petroleum coke, natural or artificial graphite, or the like. Thus by the application of this discovery, the life of graphite grounding members has been greatly increased in a very simple and efficient manner.

This reduction in the disintegration rate is believed to be due to the greatly increased surface area of the carbon electrode, and the corresponding reduction of the current density per unit or surface area affected by the use of crushed material in contact with the compact carbon member or core. Apparently, too, the employment of a porous body of carbon around the carbon core facilitates the free escape of oxidizing gases formed by electrolysis. The latter action apparently attacks the crushed carbon to a greater extent than it does the carbon core. The cheap, crushed carbon can be replaced much more easily and at less cost than can the carbon cores.

Referring now to the drawing wherein there are illustrated certain modifications of the invention;

Fig. 1 is a somewhat diagrammatic view illustrating a method of grounding pipe lines embodying the invention;

Fig. 2 illustrates one form of grounding member and associated parts; and

Fig. 3 is a view partly in section of another grounding member embodying the invention.

Referring to Fig. 1, numeral 10 designates a fragmentary portion of an underground pipe line of suitable metal, such as wrought iron or iron alloy, surrounded by moist soil adapted to cause electrolytic action, wherein the metal of the pipe acts as an anode in an electric circuit.

For developing a counter E. M. F. at least sufficient to counteract that formed by the said electrolysis, there may be provided one or more compact grounding members 12 of amorphous carbon, graphite, or other suitable conductive material highly resistant to electro-chemical attack, embedded in and surrounded by a porous mass or body 14 of crushed or granulated carbon or graphite of very large total surface area in relation to its volume, as compared with the corresponding surface and volume of the compact carbon rod or core.

In the form shown in Fig. 1 the carbon rod member 12 and the surrounding, relatively loosely-packed, carbon mass 14 are buried in the ground in the manner shown. Each of the said carbon rods is connected by the electrical conductors 16 and 18, with the outer surface of the pipe line 10 at suitable points therein subject to electrolytic corrosion. A rectifier 20 is interposed between the conductors 16 and 18 and is adapted to be actuated by a primary electric current flowing in an electric circuit 22, from a suitable source of supply of alternating current. The amount of induced current flowing in the electric circuit through the conductors 16 and 18 may be adjusted by suitable means, as by introducing a variable resistance either in that circuit or the primary circuit. If desired, the rectifier 20 and the primary electric circuit 22 may be replaced with a suitable source of direct current, such as a battery or other suitable means, in which event a rheostat may be used in the circuit for current regulation.

For preventing corrosion of the terminals of the conductors 16 at the respective ground connections, a gas-impervious seal of carbon and asphalt, or other suitable material, is provided around the terminal 26 of the conductor, and between the latter and the carbon core.

Fig. 3 illustrates a modification of the invention especially adapted for facilitating the positioning of the grounding members during preparation for service. In this form of the invention there is provided a stout casing or housing 30 of suitable metal, such as steel or other sturdy, more or less corrosion-resistant material. The casing may be, for example, in the form of a one and one-half inch steel driving pipe of suitable length, having one end tapered to provide a pointed or conical driving tip 32, and having the other end provided with a heavy driving cap 34 constructed of suitable material, such as malleable iron.

Mounted axially within the driving pipe, and spaced from the inner walls thereof, there is provided a compact ground member or core 12 of carbon or graphite of the nature of that previously described. Surrounding the member 12 and filling the space between the latter and the walls of the casing 30 is a porous body or sheath of granulated carbon or graphite 14, adapted to provide a very large contact area with both the carbon electrode 12 and with the walls of the casing 30, thus insuring a very low current density and a corresponding low contact resistance acting to effect corrosion of the metal casing. In the use of the carbon-filled casing, any corrosion, and even the final complete disintegration of the casing, leaves the ground connection unimpaired. The terminal 26 of the conductor 16 is connected with the carbon core 12 by the sealing means described above. The portion of the conductor passing through the metal cap 34 preferably is electrically insulated therefrom in suitable manner.

Other suitable grounding members or cores may be utilized in place of the carbon or graphite rods 12 mentioned specifically herein, though the latter are preferred. For example, the member 12 may be made of bonded granular silicon carbide, or it may take the form of a metal rod of copper, steel, or the like, having a thin layer or coating of granular silicon carbide or zirconia intimately bonded to its surfaces by a suitable refractory high-temperature bonding agent. The refractory mixture may contain calcium carbonate or hydrate to facilitate the formation of a highly-extended surface structure upon escape of gases during firing of this refractory-coated rod.

The porous body 14 may be formed of other suitably conductive materials highly resistant to electro-chemical attack besides carbon. Among such materials may be mentioned silicon carbide. This body has an extended surface structure, which may be due in part to the surface construction of the individual particles making up the body, and in part to the average size of the particles.

By the practice of the present invention it is possible very greatly to reduce the rate of disintegration of carbon, graphite or other members employed for grounding electric power lines or equipment, or used in connection with methods for preventing corrosion of pipe lines, thus greatly adding to the life of these grounding members and increasing their effectiveness during use for the purpose employed.

It will be obvious that the composite grounding members may be provided in a wide variety of shapes and sizes other than that indicated, and that they may be employed for many other uses besides those specifically mentioned herein.

The porous body 14 may be formed of unbonded carbon or other suitable material, or it may be in the form of a mass more or less bonded together to provide a porous body of selected shape for convenience in manufacture and in handling during use.

The invention is susceptible of modification within the scope of the appended claims.

I claim:

1. An electrode resistant to anodic attack in acid soil water, comprising a tubular metal casing pointed at one end and having a driving cap secured at the other end, the said casing having therein a body of an uncompacted granular electrically-conductive material, and a compact core of an electrically-conductive material embedded in said body, both of said materials being highly resistant to electro-chemical attack, and the said core being completely spaced from the casing and driving cap at all points.

2. An electrode resistant to anodic attack in acid soil water, which comprises a tubular metal housing having a driving member at one end and having the opposite end tapered to form a driving tip, a compact core of a refractory non-metallic electrically-conductive material disposed within the said housing and spaced from the walls of the latter and from the tip by a porous body of refractory non-metallic electrically-conductive material, both of said materials being highly resistant to electro-chemical attack, and an electric conductor connected to the said core and extending through but insulated from the said housing.

3. An electrode resistant to anodic attack in acid soil water, the same being serviceable for dissipating stray electric currents flowing in underground metal structures, which comprises a compact body of amorphous carbon or graphite, a strong metal housing for the said member having its walls in spaced relation to the latter and completely separated therefrom by a porous body of granular carbon, and an electric conductor electrically-insulated from the housing, and connected with the said member by a fluid-impervious seal of corrosion-resistant material.

4. An electrode resistant to anodic attack in acid soil water, the same being serviceable for dissipating stray electric currents flowing in underground metal structures, which comprises a metal housing having a reinforced portion at one end and having at its opposite end a tapered driving tip, a ground member of amorphous carbon or graphite disposed within the said housing and spaced from the walls of the latter and from the said tip by a porous body of granulated carbon, and an electric conductor connected to the said ground member and electrically-insulated from the housing.

5. An electrode resistant to anodic attack in acid soil water, and serviceable for dissipating stray electric currents flowing in underground metal structures, which comprises a tubular metal housing having a reinforced portion at one end and having at its opposite end a driving tip, a core of carbon disposed within the said housing and spaced from the walls of the latter and from the said tip by a porous body of granular carbon, and an electric conductor secured to the said core.

6. An electrode resistant to anodic attack in acid soil water, the same being serviceable for dissipating stray electric currents flowing in underground metal structures, which electrode comprises a tubular metal housing having a reinforcing driving cap secured at one end and having the opposite end tapered to form a driving tip, aligned apertures in the said housing and cap provided with electrically-insulated walls, a compact core of amorphous carbon or graphite disposed within the said housing and spaced from the walls of the latter and from the tip by a porous body of granular coke or graphite, and an electric conductor connected to the said core and extending through the said apertures.

RALPH C. BROWN.